(12) United States Patent
Palmer

(10) Patent No.: US 11,740,679 B2
(45) Date of Patent: Aug. 29, 2023

(54) ADAPTIVE SLEEP TRANSITION TECHNIQUES

(71) Applicant: Micron Technology, Inc., Boise, ID (US)

(72) Inventor: David Aaron Palmer, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 35 days.

(21) Appl. No.: 17/014,693

(22) Filed: Sep. 8, 2020

(65) Prior Publication Data

US 2022/0075438 A1 Mar. 10, 2022

(51) Int. Cl.
*G06F 1/32* (2019.01)
*G06F 1/3228* (2019.01)
*G06F 17/18* (2006.01)
*G06F 1/3296* (2019.01)
*G06F 1/3234* (2019.01)

(52) U.S. Cl.
CPC .......... *G06F 1/3228* (2013.01); *G06F 1/3275* (2013.01); *G06F 1/3296* (2013.01); *G06F 17/18* (2013.01)

(58) Field of Classification Search
CPC .... G06F 1/3228; G06F 1/3275; G06F 1/3296; G06F 17/18
See application file for complete search history.

(56) References Cited

U.S. PATENT DOCUMENTS

| | | | |
|---|---|---|---|
| 2011/0154080 A1* | 6/2011 | Wang | G06F 1/3228 713/323 |
| 2011/0161627 A1 | 6/2011 | Song et al. | |
| 2013/0275692 A1* | 10/2013 | Kwok | G06F 12/0246 711/156 |
| 2014/0003145 A1 | 1/2014 | Akers et al. | |
| 2014/0006824 A1 | 1/2014 | Maciocco et al. | |
| 2014/0181553 A1 | 6/2014 | Eckert et al. | |
| 2014/0181556 A1* | 6/2014 | Eckert | G06F 1/3296 713/323 |

(Continued)

FOREIGN PATENT DOCUMENTS

WO WO-2022055875 A1 3/2022

OTHER PUBLICATIONS

"International Application Serial No. PCT/US2021/049275, International Search Report dated Dec. 24, 2021", 3 pgs.

(Continued)

*Primary Examiner* — Paul B Yanchus, III
(74) *Attorney, Agent, or Firm* — Schwegman Lundberg & Woessner, P.A.

(57) ABSTRACT

Devices and techniques are disclosed herein for predicting and optimizing energy usage of a device during low-power operation. In an example, a method can include storing a duration of a plurality of low-power intervals of a device, determining a probable duration of a next low-power interval of the device based on the durations of the plurality of low-power intervals, determining a low-power state of the device for the next low-power interval based on the probable duration, upon initiating the next low-power interval, saving state information of one or more sub-systems of the device to provide first state information in response to the low-power state, and upon initiating the next low-power interval, reducing a power state of the one or more sub-systems.

26 Claims, 7 Drawing Sheets

(56) References Cited

U.S. PATENT DOCUMENTS

| | | | |
|---|---|---|---|
| 2015/0121057 A1* | 4/2015 | Arora | G06F 1/3287 |
| | | | 713/100 |
| 2015/0121106 A1* | 4/2015 | Eckert | G06F 1/324 |
| | | | 713/323 |
| 2016/0335019 A1 | 11/2016 | Li | |
| 2019/0079575 A1* | 3/2019 | Hanson | G06F 1/3237 |
| 2019/0129636 A1* | 5/2019 | Benisty | G06F 3/0625 |

OTHER PUBLICATIONS

"International Application Serial No. PCT/US2021/049275, Written Opinion dated Dec. 24, 2021", 4 pgs.

* cited by examiner

ADAPTIVE SLEEP TRANSITION TECHNIQUES

TECHNICAL FIELD

Examples of the disclosure relate generally to memory systems, and more particularly, to techniques for adaptive, power-efficient sleep mode transitions of a system including NAND memory.

BACKGROUND

Memory devices are typically provided as internal, semiconductor, integrated circuits in computers or other electronic devices. There are many different types of memory including volatile and non-volatile memory. Memory devices can often be structured as random-access memory (RAM).

Volatile memory can require power to maintain data and includes random-access memory (RAM), dynamic random-access memory (DRAM), and synchronous dynamic random-access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random-access memory (RRAM), and magnetoresistive random access memory (MRAM), 3D XPoint™ memory, among others.

Memory is utilized as volatile and non-volatile data storage for a wide range of electronic applications, including, for example, personal computers, portable memory sticks, digital cameras, cellular telephones, portable music players such as MP3 players, movie players, and other electronic devices. Memory cells can be arranged into arrays, with the arrays being used in memory devices.

Many electronic devices include several main components: a host processor (e.g., a central processing unit (CPU), processing circuitry or other main processor); main memory (e.g., one or more volatile or non-volatile memory device, such as dynamic RAM (DRAM), mobile or low-power double-data-rate synchronous DRAM (DDR SDRAM), etc.); and a storage device (e.g., non-volatile memory (NVM) device, such as flash memory, read-only memory (ROM), an SSD, an MMC, or other memory card structure or assembly, or combination of volatile and non-volatile memory, etc.). In certain examples, electronic devices can include a user interface (e.g., a display, touch-screen, keyboard, one or more buttons, etc.), a graphics processing unit (GPU), a power management circuit, a baseband processor or one or more transceiver circuits, etc.

Electronic devices have evolved such that any one device can provide an array of functionality. In addition, market forces have generally pushed electronic manufacturers to provide power efficient devices. Many methods of power saving can involve putting various elements of an electronic device to sleep, or into a low-power mode of operation. Current approaches either choose to have lots of always-on memory with lots of state information, requiring almost no energy to wake-up and rebuild state information, but burning energy through the duration of the sleep event; or choose to have very little always-on memory and to pay a relatively high energy cost to rebuild a lot of state information on wake-up.

OVERVIEW

Devices and techniques are disclosed herein for predicting and optimizing energy usage of a device during low-power operation. In an example, a method can include storing a duration of a plurality of low-power intervals of a device, determining a probable duration of a next low-power interval of the device based on the durations of the plurality of low-power intervals, determining a low-power state of the device for the next low-power interval based on the probable duration, upon initiating the next low-power interval, saving state information of one or more sub-systems of the device to provide first state information in response to the low-power state, and upon initiating the next low-power interval, reducing a power state of the one or more sub-systems.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
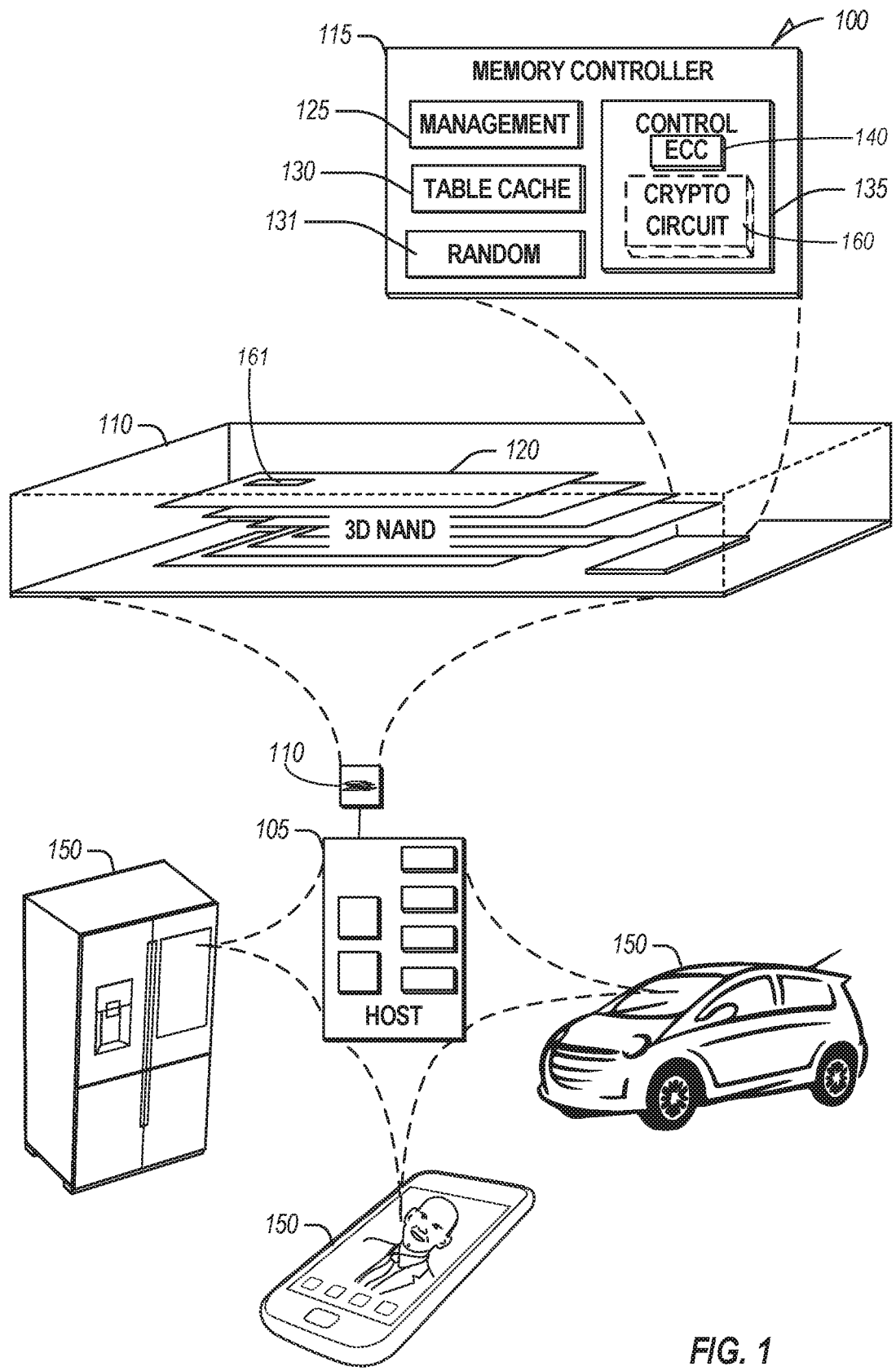
FIG. 1 illustrates an example of an environment including a memory device.

Memory devices can include individual memory die, which may, for example, include a storage region comprising one or more arrays of memory cells, implementing one (or more) selected storage technologies. Such memory die will often include support circuitry for operating the memory array(s). Other examples, sometimes known generally as "managed memory devices," include assemblies of one or more memory die associated with controller functionality configured to control operation of the one or more memory die. Such controller functionality can simplify interoperability with an external device, such as a "host" as discussed later herein. In such managed memory devices the controller functionality may be implemented on one or more die also incorporating a memory array, or on a separate die. In other examples, one or more memory devices may be combined with controller functionality to form a solid-stage drive (SSD) storage volume. The term "memory system," is used herein as inclusive of one or more memory die, and any controller functionality for such memory die, when present; and thus includes individual memory devices, managed memory devices, and SSDs.

Embodiments of the present disclosure are described in the example of managed memory devices implementing NAND flash memory cells, termed "managed NAND" devices. These examples, however, are not limiting on the scope of the disclosure, which may be implemented in other forms of memory devices and/or with other forms of storage technology.

Both NOR and NAND flash architecture semiconductor memory arrays are accessed through decoders that activate specific memory cells by selecting the word line coupled to their gates. In a NOR architecture semiconductor memory array, once activated, the selected memory cells place their data values on bit lines, causing different currents to flow depending on the state at which a particular cell is programmed. In a NAND architecture semiconductor memory array, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner unrestricted by their stored data values). Current then flows from the source line to the bit line through each series coupled group, restricted only by the selected memory cells of each group, placing current encoded data values of selected memory cells on the bit lines.

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data. Flash memory cells can also represent more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to refer to any memory cell(s) that can store more than one bit of data per cell (i.e., that can represent more than two programmed states).

Managed memory devices implementing techniques for adaptive sleep transitioning may, in some examples, be configured and operated in accordance with recognized industry standards. For example, managed memory devices may, in some examples, be managed NAND devices, such as (as non-limiting examples), a Universal Flash Storage (UFS™) device, and/or an embedded MMC device (eMMC™), etc. Of these examples, UFS devices may be configured in accordance with Joint Electron Device Engineering Council (JEDEC) standards (e.g., JEDEC standard D223D (JESD223D), and/or updates or subsequent versions to such standard. Similarly, identified eMMC devices may be configured in accordance with JEDEC standard D84-B51 (JESD84-A51), commonly referred to as JEDEC eMMC standard 5.1, etc.), and/or updates or subsequent versions to such standard. The identified standards are provided only as example environments in which the described methods and structures may be utilized; but such methods and structures may be utilized in a variety of environments outside of the identified standards (or of any other actual or proposed standards), except as expressly indicated herein." Managed NAND devices can be used as primary or ancillary memory in various forms of electronic devices, and are commonly used in mobile devices.

An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells to obviate internal battery supply requirements, thus allowing the drive to be more versatile and compact.

Both SSDs and managed memory devices can include a number of memory devices, including a number of dies or logical units (e.g., logical unit numbers or LUNs), and can include one or more processors or other controllers performing logic functions required to operate the memory devices or interface with external systems. Such SSDs and managed memory devices can include one or more flash memory die, including a number of memory arrays and peripheral circuitry thereon. The flash memory arrays can include a number of blocks of memory cells organized into a number of physical pages. In some examples, the SSDs can also include DRAM or SRAM (or other forms of memory die or other memory structures). Similarly, managed NAND devices can include one or more arrays of volatile and/or nonvolatile memory separate from the NAND storage array, and either within or separate from a controller. Both SSDs and managed NAND devices can receive commands from a host in association with memory operations, such as read or write operations to transfer data (e.g., user data and associated integrity data, such as error data and address data, etc.) between the memory devices and the host, or erase operations to erase data from the memory devices.

FIG. 1 illustrates an example of a memory device 110 that may be included in a variety of products, such as Internet of Things (IoT) devices (e.g., a refrigerator or other appliance, sensor, motor or actuator, mobile communication device, automobile, drone, etc.) to support processing, communications, or control of a product. The memory device 110 includes a memory controller 115 and a memory array 120. The memory array 120 may include a number of individual memory die (e.g., a two-dimensional (2D) NAND die, or a stack of three-dimensional (3D) NAND die). The memory arrays 120 can be 2D structures arranged on a surface of a semiconductor substrate. To increase memory capacity for a given area, and to decrease cost, the size of the individual memory cells has decreased. Alternatively, memory arrays 120 can be 3D structures, such as 3D NAND memory devices that can further increase memory density and lower memory cost.

Such 3D NAND devices often include strings of storage cells, coupled in series (e.g., drain to source), between one or more source-side select gates (SGSs) proximate a source, and one or more drain-side select gates (SGDs) proximate a bit line. In an example, the SGSs or the SGDs can include one or more field-effect transistors (FETs) or metal-oxide semiconductor (MOS) structure devices, etc. In some examples, the strings will extend vertically, through multiple vertically spaced tiers containing respective word lines. A semiconductor structure may extend adjacent a string of storage cells to form a channel for the storage cells of the string. In the example of a vertical string, the polysilicon structure may be in the form of a vertically extending pillar. In some examples the string may be "folded," and thus arranged relative to a U-shaped pillar. In other examples, multiple vertical structures may be stacked upon one another to form stacked arrays of storage cell strings.

In 3D architecture semiconductor memory technology, vertical structures are stacked, increasing the number of tiers, physical pages, and accordingly, the density of a memory device (e.g., a storage device). In an example, the memory device 110 can be a discrete memory or storage device component of a host device. In other examples, the memory device 110 can be a portion of an integrated circuit (e.g., system on a chip (SOC), etc.), stacked or otherwise included with one or more other components of a host device.

The memory controller 115 can communicate with the memory array 120, such as to transfer data to (e.g., write or erase) or from (e.g., read) one or more of the memory cells, planes, sub-blocks, blocks, or pages of the memory array. The memory controller 115 can include, among other things, circuitry or firmware, including one or more components or integrated circuits. For example, the memory controller 115 can include one or more memory control units, circuits, or components configured to control access across the memory array 120 and to provide a translation layer between a host and the memory device 110. The memory controller 115 can include one or more input/output (I/O) circuits, lines, or interfaces to transfer data to or from the memory array 120. The memory controller 115 can include a memory manager 125 and an array controller 135.

The memory manager 125 can include, among other things, circuitry or firmware, such as a number of components or integrated circuits associated with various memory management functions. For purposes of the present description, example memory operation and management functions will be described in the context of NAND memory. Persons skilled in the art will recognize that other forms of non-volatile memory may have analogous memory operations or management functions. Such NAND management functions include wear leveling (e.g., garbage collection or reclamation), error detection or correction, block retirement, or one or more other memory management functions. The memory manager 125 can parse or format host commands (e.g., commands received from a host) into device commands (e.g., commands associated with operation of a memory array, etc.), or generate device commands (e.g., to accomplish various memory management functions) for the array controller 135 or one or more other components of the memory device 110.

The memory manager 125 can include a set of management tables 130 configured to maintain various information associated with one or more component of the memory device 110 (e.g., various information associated with a memory array or one or more memory cells coupled to the memory controller 115). For example, the management tables 130 can include information regarding block age, block erase count, error history, or one or more error counts (e.g., a write operation error count, a read bit error count, a read operation error count, an erase error count, etc.) for one or more blocks of memory cells coupled to the memory controller 115. In certain examples, if the number of detected errors for one or more of the error counts is above a threshold, the bit error can be referred to as an uncorrectable bit error. The management tables 130 can maintain a count of correctable or uncorrectable bit errors, among other things.

The array controller 135 can include, among other things, circuitry or components configured to control memory operations associated with writing data to, reading data from, or erasing one or more memory cells of the memory device 110 coupled to the memory controller 115. The array controller 135 can include an error correction code (ECC) component 140, which can include, among other things, an ECC engine or other circuitry configured to detect or correct errors associated with writing data to or reading data from one or more memory cells of the memory device 110 coupled to the memory controller 115. The memory controller 115 can be configured to actively detect and recover from error occurrences (e.g., bit errors, operation errors, etc.) associated with various operations or storage of data, while maintaining integrity of the data transferred between a host and the memory device 110, or maintaining integrity of stored data (e.g., using redundant RAID storage, etc.), and can remove (e.g., retire) failing memory resources (e.g., memory cells, memory arrays, pages, blocks, etc.) to prevent future errors.

In some examples, the memory array may comprise a number of NAND dies and one or more functions of the memory controller 115 for a particular NAND die may be implemented on an on-die controller on that particular die. Other organizations and delineations of control functionality may also be utilized, such as a controller for each die, plane, superblock, block, page, and the like.

The memory array 120 can include several memory cells arranged in, for example, a number of devices, semi-conductor dies, planes, sub-blocks, blocks, or pages. In operation, data is typically written to or read from the NAND memory device 110 in pages, and erased in blocks. However, one or more memory operations (e.g., read, write, erase, etc.) can be performed on larger or smaller groups of memory cells, as desired. The data transfer size of a NAND memory device 110 is typically referred to as a page; whereas the data transfer size of a host is typically referred to as a sector.

Although a page of data can include a number of bytes of user data (e.g., a data payload including a number of sectors of data) and its corresponding metadata, the size of the page often refers only to the number of bytes used to store the user data. As an example, a page of data having a page size of 4 KB may include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells or memory arrays 120 can provide for different page sizes, or may require different amounts of metadata associated therewith. For example, different memory device types may have different bit error rates, which can lead to different amounts of metadata necessary to ensure integrity of the page of data (e.g., a memory device with a higher bit error rate may require more bytes of error correction code data than a memory device with a lower bit error rate). As an example, a multi-level cell (MLC) NAND flash device may have a higher bit error rate than a corresponding single-level cell (SLC) NAND flash device. As such, the MLC device may require more metadata bytes for error data than the corresponding SLC device.

Figure 2:
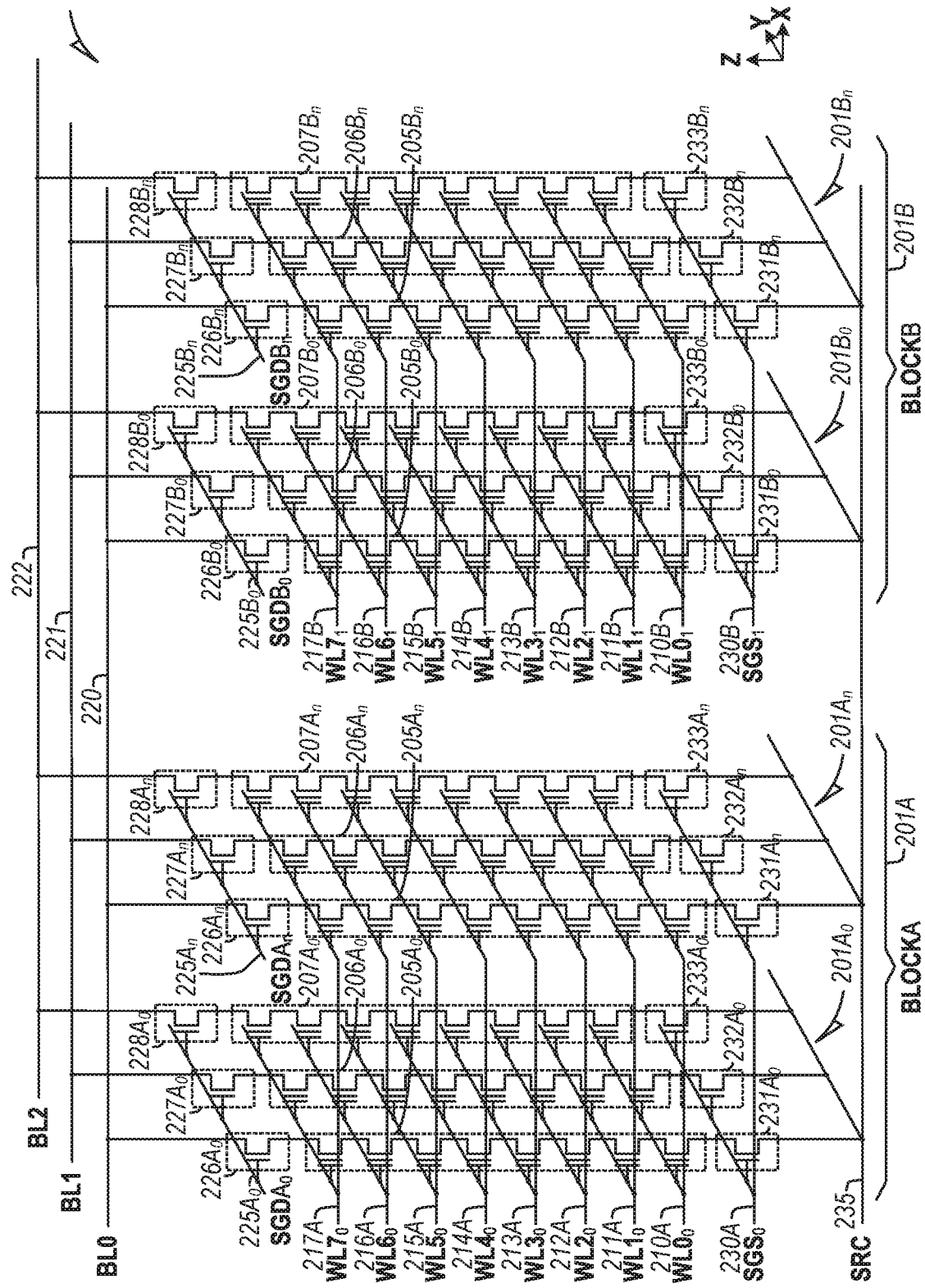
FIG. 2 and FIG. 3 are schematic diagrams illustrating examples of NAND architecture semiconductor memory array.

FIG. 2 is a schematic diagram illustrating an example of a 3D NAND architecture semiconductor memory array 200 including a number of strings of memory cells (e.g., first-third A0 memory strings 205A0-207A0, first-third An memory strings 205An-207An, first-third B0 memory strings 205B0-207B0, first-third Bn memory strings 205Bn-207Bn, etc.), organized in blocks (e.g., block A 201A, block B 201B, etc.) and sub-blocks (e.g., sub-block A0 201A0, sub-block An 201An, sub-block B0 201B0, sub-block Bn 201Bn, etc.). The memory array 200 represents a portion of a greater number of similar structures that would typically be found in a block, device, or other unit of a memory device.

Each string of memory cells includes a number of tiers of charge storage transistors (e.g., floating gate transistors, charge-trapping structures, etc.) stacked in the Z direction, source to drain, between a source line (SRC) 235 or a source-side select gate (SGS) (e.g., first-third A0 SGS 231A0-233A0, first-third An SGS 231An-233An, first-third B0 SGS 231B0-233B0, first-third Bn SGS 231Bn-233Bn, etc.) and a drain-side select gate (SGD) (e.g., first-third A0 SGD 226A0-228A0, first-third An SGD 226An-228An, first-third B0 SGD 226B0-228B0, first-third Bn SGD 226Bn-228Bn, etc.). Each string of memory cells in the 3D memory array can be arranged along the X direction as data lines (e.g., bit lines (BL) BL0-BL2 220-222), and along the Y direction as physical pages.

Within a physical page, each tier represents a row of memory cells, and each string of memory cells represents a column. A sub-block can include one or more physical pages. A block can include a number of sub-blocks (or physical pages) (e.g., 128, 256, 384, etc.). Although illustrated herein as having two blocks, each block having two sub-blocks, each sub-block having a single physical page, each physical page having three strings of memory cells, and each string having 8 tiers of memory cells, in other examples, the memory array 200 can include more or fewer blocks, sub-blocks, physical pages, strings of memory cells, memory cells, or tiers. For example, each string of memory cells can include more or fewer tiers (e.g., 16, 32, 64, 128, etc.), as well as one or more additional tiers of semiconductor material above or below the charge storage transistors (e.g., select gates, data lines, etc.), as desired. As an example, a 48 GB TLC NAND memory device can include 18,592 bytes (B) of data per page (16.384+2208 bytes), 1536 pages per block, 548 blocks per plane, and 4 or more planes per device.

Each memory cell in the memory array 200 includes a control gate (CG) coupled to (e.g., electrically or otherwise operatively connected to) an access line (e.g., word lines (WL) WL00-WL70 210A-217A, WL01-WL71 210B-217B, etc.), which collectively couples the control gates (CGs) across a specific tier, or a portion of a tier, as desired. Specific tiers in the 3D memory array, and accordingly, specific memory cells in a string, can be accessed or controlled using respective access lines. Groups of select gates can be accessed using various select lines. For example, first-third A0 SGD 226A0-228A0 can be accessed using an A0 SGD line SGDA0 225A0, first-third An SGD 226An-228An can be accessed using an SGD line SGDAn 225An, first-third B0 SGD 226B0-228B0 can be accessed using a B0 SGD line SGDB0 225B0, and first-third Bn SGD 226Bn-228Bn can be accessed using a Bn SGD line SGDBn 225Bn. First-third A0 SGS 231A0-233A0 and first-third An SGS 231An-233An can be accessed using a gate select line SGS0 230A, and first-third B0 SGS 231B0-233B0 and first-third Bn SGS 231Bn-233Bn can be accessed via a gate select line SGS1 230B.

In an example, the memory array 200 can include a number of levels of semiconductor material (e.g., polysilicon, etc.) configured to couple the control gates (CGs) of each memory cell or select gate (or a portion of the CGs or select gates) of a respective tier of the array. Specific strings of memory cells in the array can be accessed, selected, or controlled using a combination of bit lines (BLs) and select gates, etc., and specific memory cells at one or more tiers in the specific strings can be accessed, selected, or controlled using one or more access lines (e.g., WLs).

Figure 3:
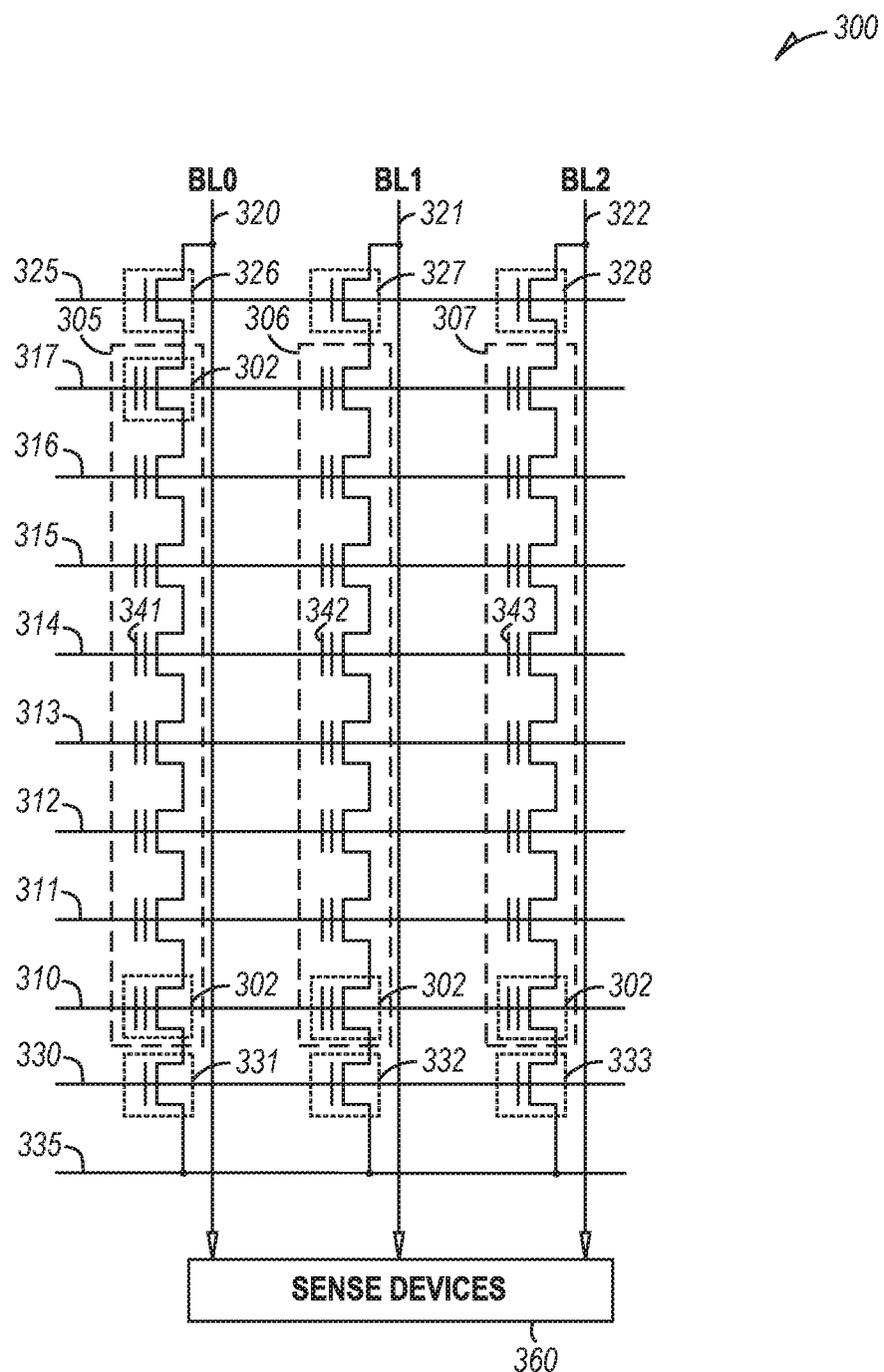

FIG. 3 illustrates an example schematic diagram of a portion of a NAND architecture semiconductor memory array 300 including a plurality of memory cells 302 arranged in a two-dimensional array of strings (e.g., first-third strings 305-307) and tiers (e.g., illustrated as respective word lines (WL) WL0-WL7 310-317, a drain-side select gate (SGD) line 325, a source-side select gate (SGS) line 330, etc.), and sense amplifiers or devices 360. For example, the memory array 300 can illustrate an example schematic diagram of a portion of one physical page of memory cells of a 3D NAND architecture semiconductor memory device, such as illustrated in FIG. 2.

Each string of memory cells is coupled to a source line (SRC) using a respective source-side select gate (SGS) (e.g., first-third SGS 331-333), and to a respective data line (e.g., first-third bit lines (BL) BL0-BL2 320-322) using a respective drain-side select gate (SGD) (e.g., first-third SGD 326-328). Although illustrated with 8 tiers (e.g., using word lines (WL) WL0-WL7 310-317) and three data lines (BL0-BL2 326-328) in the example of FIG. 3, other examples can include strings of memory cells having more or fewer tiers or data lines, as desired.

In a NAND architecture semiconductor memory array, such as the example memory array 300, the state of a selected memory cell 302 can be accessed by sensing a current or voltage variation associated with a particular data line containing the selected memory cell. The memory array 300 can be accessed (e.g., by a control circuit, one or more processors, digital logic, etc.) using one or more drivers. In an example, one or more drivers can activate a specific memory cell, or set of memory cells, by driving a particular potential to one or more data lines (e.g., bit lines BL0-BL2), access lines (e.g., word lines WL0-WL7), or select gates, depending on the type of operation desired to be performed on the specific memory cell or set of multiple memory cells.

To program or write data to a memory cell, a programming voltage (Vpgm) (e.g., one or more programming pulses, etc.) can be applied to selected word lines (e.g., WL4), and thus, to a control gate of each memory cell coupled to the selected word lines (e.g., first-third control gates (CGs) 341-343 of the memory cells coupled to WL4). Programming pulses can begin, for example, at or near 15V, and, in certain examples, can increase in magnitude during each programming pulse application. While the program voltage is applied to the selected word lines, a potential, such as a ground potential Vss, can be applied to the data lines (e.g., bit lines) and substrates (and thus the channels, between the sources and drains) of the memory cells targeted for programming, resulting in a charge transfer (e.g., direct injection or Fowler-Nordheim (FN) tunneling, etc.) from the channels to the floating gates of the targeted memory cells.

In contrast, a pass voltage (VPASS) can be applied to one or more word lines having memory cells that are not targeted for programming, or an inhibit voltage (e.g., Vcc can be applied to data lines (e.g., bit lines) having memory cells that are not targeted for programming, for example, to inhibit charge from being transferred from the channels to the floating gates of such non-targeted memory cells. The pass voltage can be variable, depending, for example, on the proximity of the applied pass voltages to a word line targeted for programming. The inhibit voltage can include a supply voltage (Vcc), such as a voltage from an external source or supply (e.g., a battery, an AC-to-DC converter, etc.), relative to a ground potential Vss.

As an example, if a programming voltage (e.g., 15V or more) is applied to a specific word line, such as WL4, a pass voltage of 10V can be applied to one or more other word lines, such as WL3, WL5, etc., to inhibit programming of non-targeted memory cells, or to retain the values stored on such memory cells not targeted for programming. As the distance between an applied program voltage and the non-targeted memory cells increases, the pass voltage required to refrain from programming the non-targeted memory cells can decrease. For example, where a programming voltage of 15V is applied to WL4, a pass voltage of 10V can be applied to WL3 and WL5, a pass voltage of 8V can be applied to WL2 and WL6, a pass voltage of 7V can be applied to WL1 and WL7, etc. In other examples, the pass voltages, or number of word lines, etc., can be higher or lower, or more or less.

The sense amplifiers 360, coupled to one or more of the data lines (e.g., first, second, or third bit lines (BL0-BL2) 320-322), can detect the state of each memory cell in respective data lines by sensing a voltage or current on a particular data line.

Between applications of one or more programming pulses (e.g., Vpgm), a verify operation can be performed to determine if a selected memory cell has reached its intended programmed state. If the selected memory cell has reached its intended programmed state, it can be inhibited from further programming. If the selected memory cell has not reached its intended programmed state, additional programming pulses can be applied. If the selected memory cell has not reached its intended programmed state after a particular number of programming pulses (e.g., a maximum number), the selected memory cell, or a string, block, or page associated with such selected memory cell, can be marked as defective.

To erase a memory cell or a group of memory cells (e.g., erasure is typically performed in blocks or sub-blocks), an erasure voltage (Vers) (e.g., typically Vpgm) can be applied to the substrates (and thus the channels, between the sources and drains) of the memory cells targeted for erasure (e.g., using one or more bit lines, select gates, etc.), while the word lines of the targeted memory cells are kept at a potential, such as a ground Vss, resulting in a charge transfer (e.g., direct injection or Fowler-Nordheim (FN) tunneling, etc.) from the floating gates of the targeted memory cells to the channels.

Figure 4:
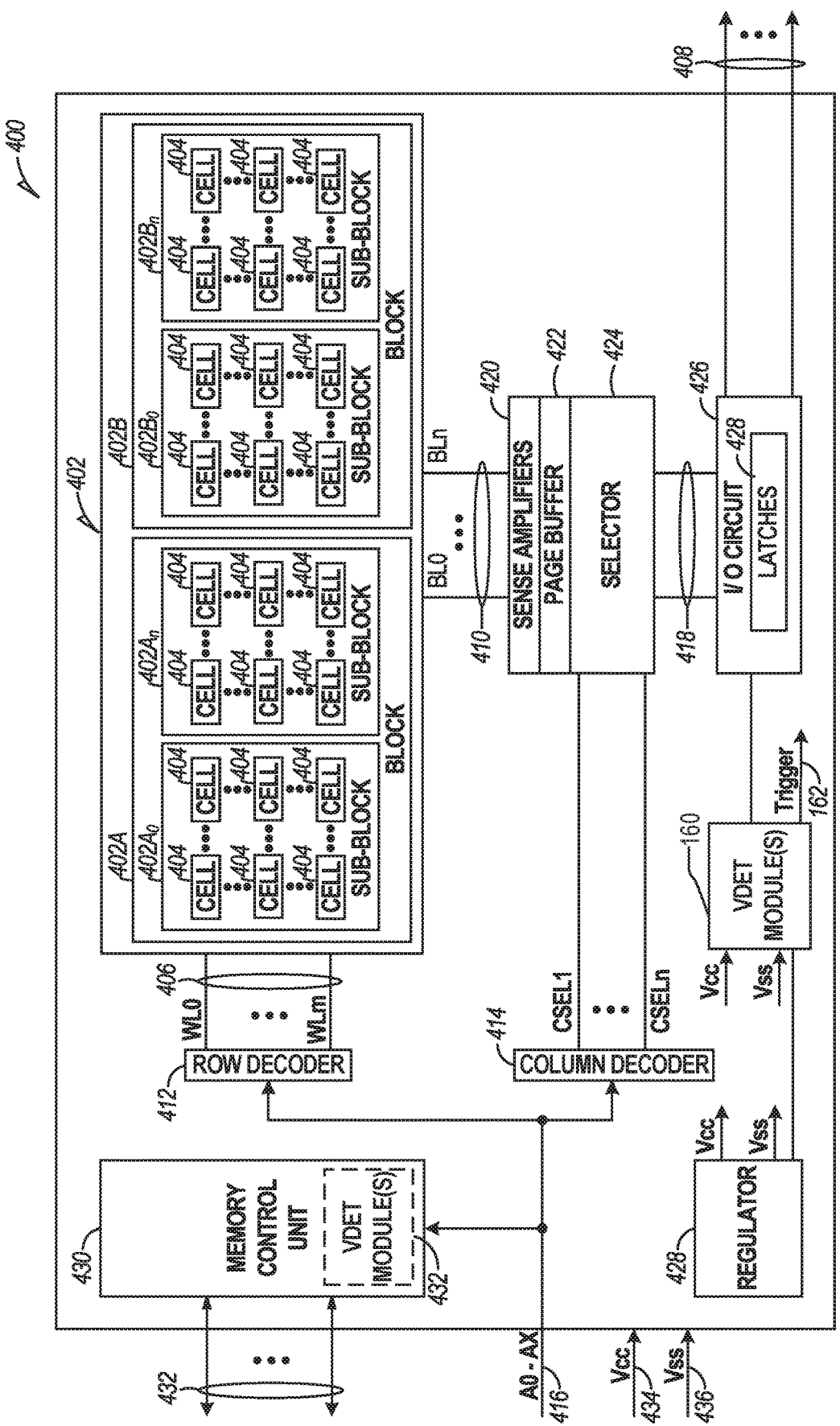
FIG. 4 is a block diagram illustrating an example of a memory module.

FIG. 4 is a block diagram illustrating an example of a memory device 400 including a memory array 402 having a plurality of memory cells 404, and one or more circuits or components to provide communication with, or perform one or more memory operations on, the memory array 402. The memory device 400 can include a row decoder 412, a column decoder 414, sense amplifiers 420, a page buffer 422, a selector 424, an input/output (I/O) circuit 426, and a memory control unit 430.

The memory cells 404 of the memory array 402 can be arranged in blocks, such as first and second blocks 402A, 402B. Each block can include sub-blocks. For example, the first block 402A can include first and second sub-blocks 402A0, 402An, and the second block 402B can include first and second sub-blocks 402B0, 402Bn. Each sub-block can include a number of physical pages, each page including a number of memory cells 404. Although illustrated herein as having two blocks, each block having two sub-blocks, and each sub-block having a number of memory cells 404, in other examples, the memory array 402 can include more or fewer blocks, sub-blocks, memory cells, etc. In other examples, the memory cells 404 can be arranged in a number of rows, columns, pages, sub-blocks, blocks, etc., and accessed using, for example, access lines 406, first data lines 410, or one or more select gates, source lines, etc.

The memory control unit 430 can control memory operations of the memory device 400 according to one or more signals or instructions received on control lines 432, including, for example, one or more clock signals or control signals that indicate a desired operation (e.g., write, read, erase, etc.), or address signals (A0-AX) received on one or more address lines 416. One or more devices external to the memory device 400 can control the values of the control signals on the control lines 432, or the address signals on the address line 416. Examples of devices external to the memory device 400 can include, but are not limited to, a host, a memory controller, a processor, or one or more circuits or components not illustrated in FIG. 4.

The memory device 400 can use access lines 406 and first data lines 410 to transfer data to (e.g., write or erase) or from (e.g., read) one or more of the memory cells 404. The memory control unit 430 may include a state machine 431 coupled to the row decoder 412, the column decoder 414, and the I/O circuit 426. The state machine 413 can also output status data of the flash memory such as READY/BUSY or PASS/FAIL. In some designs, the state machine 413 can be configured to manage the programming process. The row decoder 412 and the column decoder 414 can receive and decode the address signals (A0-AX) from the address line 416, determine which of the memory cells 404 are to be accessed, and provide signals to one or more of the access lines 406 (e.g., one or more of a plurality of word lines (WL0-WLm)) or the first data lines 410 (e.g., one or more of a plurality of bit lines (BL0-BLn)), such as described above.

The memory device 400 can include sense circuitry, such as the sense amplifiers 420, configured to determine the values of data on (e.g., read), or to determine the values of data to be written to, the memory cells 404 using the first data lines 410. For example, in a selected string of memory cells 404, one or more of the sense amplifiers 420 can read a logic level in the selected memory cell 404 in response to a read current flowing in the memory array 402 through the selected string to the data lines 410.

One or more devices external to the memory device 400 can communicate with the memory device 400 using the I/O lines (DQ0-DQN) 408, address lines 416 (A0-AX), or control lines 432. The input/output (I/O) circuit 426 can transfer values of data in or out of the memory device 400, such as in or out of the page buffer 422 or the memory array 402, using the I/O lines 408, according to, for example, the control lines 432 and address lines 416. The page buffer 422 can store data received from the one or more devices external to the memory device 400 before the data is programmed into relevant portions of the memory array 402, or can store data read from the memory array 402 before the data is transmitted to the one or more devices external to the memory device 400.

The column decoder 414 can receive and decode address signals (A0-AX) into one or more column select signals (CSEL1-CSELn). The selector 424 (e.g., a select circuit) can receive the column select signals (CSEL1-CSELn) and select data in the page buffer 422 representing values of data to be read from or to be programmed into memory cells 404.

Selected data can be transferred between the page buffer 422 and the I/O circuit 426 using second data lines 418. In some examples a flash translation layer (not shown) can map addresses provided by a host to physical memory addresses used by the row decoder 412 and column decoder 414 to read data in the memory array 402.

The memory control unit 430 can receive positive and negative supply signals, such as a supply voltage Vcc 434 and a ground potential Vss 436, from an external source or supply (e.g., an internal or external battery, an AC-to-DC converter, etc.). In certain examples, the memory control unit 430 can include a regulator 428 to internally provide positive or negative supply signals.

As previously described, a memory cell of a memory device can be arranged as either an SLC configured to store only a single bit of data, or an MLC that stores two or more bits of data. For example, a triple-level cell (TLC) can store three bits of data per cell, and a quad-level cell (QLC) can store four bits of data per cell. Compared to MLC (e.g., TLC or QLC) storage. SLC cells generally store less data, and manufacturing memory devices in capacities suitable for use as a storage device using just SLC memory cells is less cost effective. However. SLC memory cells may offer better performance with higher reliability. For example, SLC cells may be written to with fewer programming cycles, thereby reducing the chances of corruption from an unexpected power loss during programming. A compromise solution to memory management is using an SLC cache, where some cells may be configured as SLC and other cells as MLC. For example, data may be first written to the SLC, and later transferred to the MLC when the memory device is not busy (e.g., idle state). In some examples, when receiving a host write request, the memory controller can check if there is free SLC cache. Data can then be written to the SLC cache if there is free SLC cache, or instead written to MLC storage directly if no free SLC cache is available. The SLC cache mechanism provides a balance between the speed and reliability of SLC memory cells with the storage capacity of MLC memory cells. In some example memory devices, the memory cells can be reconfigurable by firmware between SLC and MLC, and the cache size can vary during usage (dynamic size SLC cache). For example, the SLC cache size can vary based upon how full the memory device is (device utilization). As the device fills up, memory cells configured as SLC cache are migrated to MLC to increase total data storage capacity.

The use of SLC cache may lead to write amplification (WA) because same data is written twice to the physical media of the flash memory, first to the SLC cache and then to the MLC storage. A WA metric can be determined as the actual amount of information physically written to the storage media relative to the logical amount that a host intends to write over the life of that data as it moves throughout the memory device. The larger the SLC cache, the more likely a write request is to be serviced by SLC cache, hence the greater the likelihood of an increase in WA. In addition to the use of SLC cache, garbage collection (GC) may also lead to a large WA, as previously discussed.

Storage devices, such as non-volatile storage devices, including managed NAND storage devices, are often used in host systems which have a limited power source such as a battery (e.g., mobile phone). Energy usage of the storage system can be critical metric, and such systems can aggressively make use of low-power modes to conserve energy and extend battery life. Storage devices, including managed memory devices, can be put to sleep to assist in conserving power. Some storage devices can have multiple modes of sleep with each mode representing a different sleep level. When storage devices are put into sleep mode by a host, an event that can occur thousands of times per day—there is an energy trade-off between how much controller memory is maintained with state information and how much energy will be required to rebuild that slate information at the time of wake-up. The sleep mode ranges can provide varying degrees of power consumption which are usually offset by wake-up latency (e.g., light sleep mode (high energy usage) corresponds to fast wake-up, while deep sleep mode (low energy usage) corresponds to slow wake-up). If a sleep mode duration is very short, it can be more energy efficient to keep a lot of state in active memory, whereas if a sleep mode duration is long, it can be more efficient to drop state information to non-volatile memory and disable the controller memory. The energy saved by disabling the controller memory can be more than the than the energy required to rebuild that state information on wake-up. Current approaches to implementing sleep modes either choose to have lots of always-on memory with lots of state information, requiring almost no energy to wake-up and rebuild state information, but burning energy through the duration of the sleep event; or choose to have very little always-on memory and to pay a relatively high energy cost to rebuild a lot of state information on wake-up.

The present inventor has recognized an adaptive prediction mechanism for subsequent low-power intervals that can be used to prepare and place an amount of controller memory in a low-power mode consistent with optimizing power usage through the actual low-power duration and upon awakening any sleeping memory to a desired state at the conclusion of the low-power interval. One non-limiting example of the kind of data that can be involved with a low-power mode is data recovery information. In certain systems, for example, a NAND storage device can be maintaining hundreds of kilobytes of partial redundant array calculations. Upon considering placing the device in a low-power mode, the options include maintaining the recovery information which requires a relatively high amount of energy, or dropping the recovery information and then upon awakening, rebuilding the recovery information before accepting any new commands. Dropping the recovery takes less energy but can result in a significant delay upon reawakening before being able to provide useful functionality. For example, awakening a sub-system can begin a process of loading and processing tens of megabytes of data from a non-volatile storage array which can take several tens of milliseconds.

As a further example, in an example device, 2.4 mW of power may be needed to maintain full recovery information of a system or sub-system during a low-power interval of a given duration. It can take 2000 mW of power over 50 ms to rebuild the full recovery information upon reawakening from a low-power interval, or about 100 milli-Joules (mJ). Energy parity with fully maintained recovery information can be achieved if the low-power interval is results in less than 100 mJ expenditure, or 100 mJ/2.4 mW=41.67 seconds. That is, if the system or subsystem is to be placed in a low-power interval for longer than 41.67 seconds it is more energy efficient to dump the parity and rebuild it than to maintain it in active RAM. It is understood that sleep intervals for a system or subsystem, and the power consumed for each, can vary widely and the above example is only an example.

Figure 5:
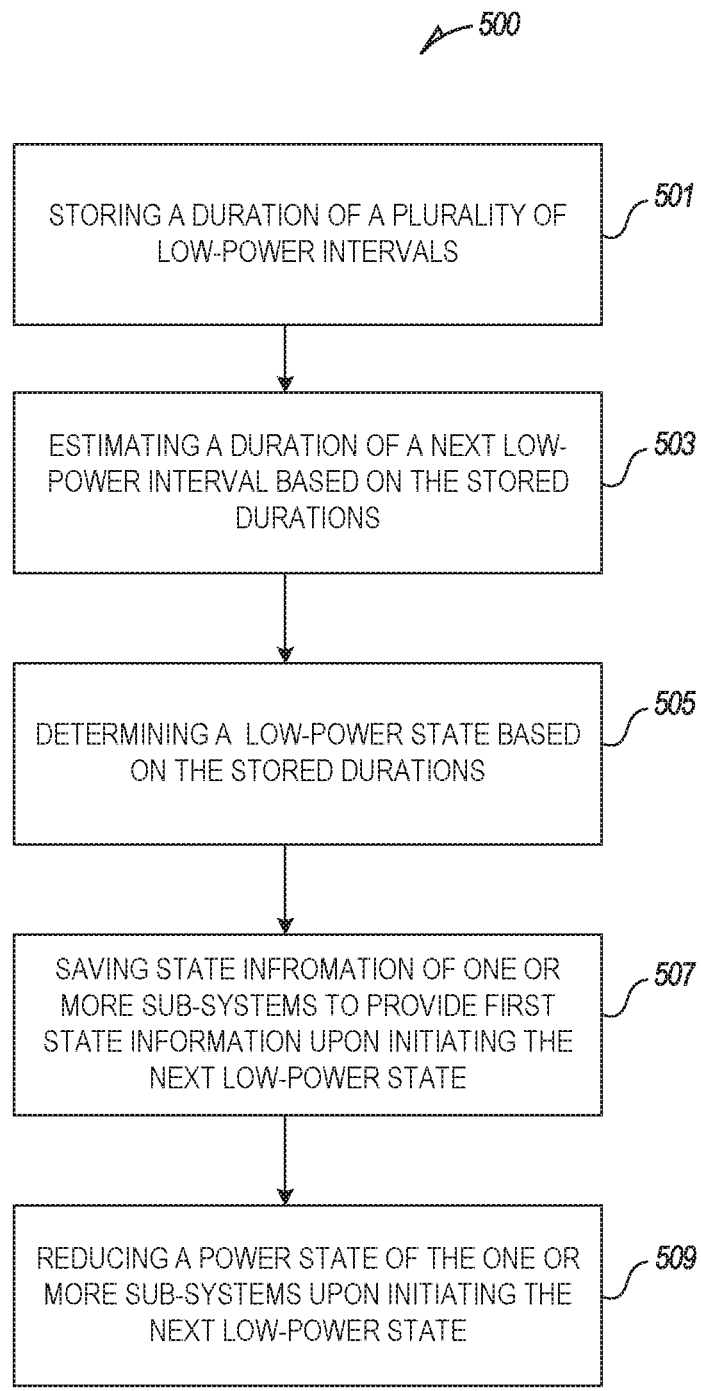
FIG. 5 illustrates generally a flowchart of an example method for predicting a duration of an upcoming low-power interval of an electronic device.

FIG. 5 illustrates generally a flowchart of an example method 500 for predicting a duration of an upcoming low-power interval of an electronic device. In certain examples, the predictive method can estimate the duration of the low-power interval and sub-systems of the electronic device to be powered down during the interval. In conventional electronic systems, the process of entering a low-power mode and of waking from a low-power mode can be somewhat rigid. As such, power can be wasted in shutting down or awaking unnecessarily that could have allowed longer low-power operation, for example. The present inventor has recognized that the cause, length, and depth of low power operation can vary significantly. For example, time of day, or day of the week, or combination of both can be a significant factor in predicting a depth of a low-power mode. For example, regardless of day-of-the week, a low power mode initiated late at night is more likely to be a deeper low-power mode than say a low-power mode initiated just after a user wakes in the morning. The depth of a low-power mode in this context is given by the number of sub-systems or the potential power savings of the sub-systems of the device that can be shut down without significantly impacting the user experience of the electronic device. As such, a low-power mode initiated late at night such as when the user is sleeping can shut down nearly all sub-systems, and for a significant duration. However, a low-power mode initiated just after detecting use of the electronic device in the morning, such as when the user is getting ready for the day, will predictable not be as long and maybe useful to keep some subsystems, such as e-mail or calendar, active such that the sub-systems are ready and available to the user during the low-power interval or if the low-power interval does not last as long as predicted. A nuance of the shorter, shallower, low-power modes is that power can be saved by leaving some sub-system fully powered compared to shutting those sub-systems down are starting them after a short low-power interval. In some examples, during some shorter, low-power intervals, the user experience can benefit by leaving a sub-system running that otherwise would potentially interrupt desired user activity because of a lengthy start-up.

At 501, the method can include generating historical low-power transition information. In some examples, the historical low-power transition information can include information associated with past low-power intervals. The information can include, but is not limited to, the actual duration of the low-power interval, time of day of the low-power interval, day of week of the low-power interval, date of the low-power interval, state information of device prior to low-power interval, state information or workload information of the device during the low-power interval, estimate associated with the low-power interval, location information at or about the time of the low-power interval, or combinations thereof.

At 503, a duration of a next low-power interval can be estimated based on the historical low-power transition information. In an example, an estimation algorithm can use the time of day, day of the week, location or other historical information to provide one or more estimates of the duration of a next low-power-transition event. In some examples, an addition estimate can provide a confidence factor for each duration estimate. In an example, if the current workload of the device matches a historical workload associated with a previous low-power interval, the duration of that previous low-power interval can be used as the estimated duration. In some examples, a weighted average of the historical information can be used to estimate the next low-power interval duration. Such a weighted average can be used to estimate a duration for the previous example in the absence of a prior low-power interval having a matching workload. At 505, a low-power implementation can be determined for the next low-power state based on the duration estimate. A controller of the device can use the low-power implementation to adjust power states of sub-systems of the device when the next low-power state is initiated. Determination of the low-power implementation can consider the sub-systems that are active at the initiation of the low-power state and the power ramifications of adjusting each sub-system for the estimated duration. Such ramifications may weigh the energy use benefits of lowering and subsequently raising the power state of a subsystem compared to allowing the subsystem to operated in a higher power state for the estimated duration of the next low-power state. In some situations, determination of a low-power implementation of one or more subsystems can offset potential energy savings with how the low-power state of each subsystems negatively effects user experience when the next low-power state concludes. For example, if a sub-system can impede use of the device or a function of the device, for several minutes at the conclusion of a low-power interval, the sub-system may be placed in a low-power state only when the probability of the user requesting the functionality of that sub-system at the conclusion of the low-power interval is relatively low.

The duration estimate, the determination of the low-power implementation, or both the duration estimate and the determination of the low-power implementation, can be implemented using the historical low-power transition information and one or more predictive algorithms. Such predictive algorithms may include regression analysis, machine learning techniques or combinations thereof. In certain examples, the device can include a training aspect to categorize and generate historical information. For example, a training aspect can provide one or more multipliers to assist in estimating a next low-power duration. The multipliers can be part of the historical data discussed above. One example multiplier can be a time-of-day multiplier. A time of day multiplier can maintain a running average of actual duration of low power events for the past X periods and can construct a look-up table of X multipliers by computing each period's arithmetic average, where X is a positive integer. For example, each period can be an hour and the total training period can be three days (e.g., 72 hours). The look-up table can have a multiplier for each hour of the day. The multiplier can represent the average duration of all the low-power events that happened during a particular hour of the day over the last three days. One could reasonably predict that for a user who works a day job, for example, the average low-power event duration at 1:00 pm in the afternoon over a three-day period will be much shorter than the average low power event duration at 1:00 am over the same three-day period.

As an example, a second multiplier can be battery aware multiplier. The battery aware multiplier can maintain a running average of durations of low-power-events when the device is charging and when the device is not charging. Thus, the historical data may include a 2-value look-up table including a representation of the average low-power event duration when the device is charging and the average low-power event duration when the device is not charging. Additional historical information can include, but is not limited to, some details of each of the last Y number of low-power interval events, where Y is a positive integer. Some details can include, but are not limited to, the number of read commands currently buffered, number of read command s executed since the last low-power interval, the number of write commands currently buffered, number of write commands executed since the last low-power interval, total awake time since last low-power interval, battery state, time at wake-up, or combinations thereof.

In certain examples, at the time of entering a low-power event, the duration estimate can be determined. In an example, if one or more of the prior low-power events has the same workload (e.g., reads, writes, etc.) as the current state of the device, the estimate can use the actual duration of those prior matching, low-power events as the duration estimate. Such an algorithm assumes that a certain workload is somewhat consistent and that low-power durations associated with such workloads will also be consistent. If at the time of initiating a low-power state, a matching workload is not found in the historical data, an estimated duration can be calculated. As discussed above, there are many algorithms that can be used to provide an estimate using the historical data. In one example, a weighted average scheme can be used to provide an estimated duration of the low-power interval. In some examples, the weighted average can be skewed to more recent low-power events. For example, if the training aspect maintains information about the last N low-power events, an estimated duration ($d_{est}$) for the next low power event that is skewed toward more recent low power events can be given by:

$$d_{est} = \left(1 - \frac{\frac{N}{2}}{100}\right)D_0 + \left(1 - \frac{\frac{N}{2}-1}{100}\right)D_1 + \ldots + \left(1 - \frac{\frac{N}{2}-N}{100}\right)D_N, \quad \text{Eq. 1}$$

where N is the number of most-recent, past, low-power events tracked by the training aspect, and $D_i$ is the actual duration of those N most-recent past low-power events with $D_N$ being associated with the most recent past event. In certain examples, the estimated duration can be further processed by multiplying or dividing the estimate duration ($d_{est}$) of Eq. 1 by one or more of the multipliers tracked by training aspect.

Improved energy use and conservation is one of the benefits of the present subject matter. For mobile devices or devices with a limited power source, the techniques herein can allow for longer periods between charging. In certain examples, the duration estimate, and determination of the low-power implementation can be executed on a device remote from the target device and the results can be communicated to the target device. Such examples can further reduce energy consumption of the target device as the processing of the estimate and determination can be off-loaded to a device whose energy conservation tasks are of a lower priority than the target device.

Referring again to FIG. 5, at 507, upon initiating the next low-power interval, state information of the device can be saved to memory. The state information can be used to reconfigure and reset the state of the device at the end of the low-power interval. At 509, after the state information is saved, power states of sub-systems can be adjusted according to the low-power implementation.

Figure 6:
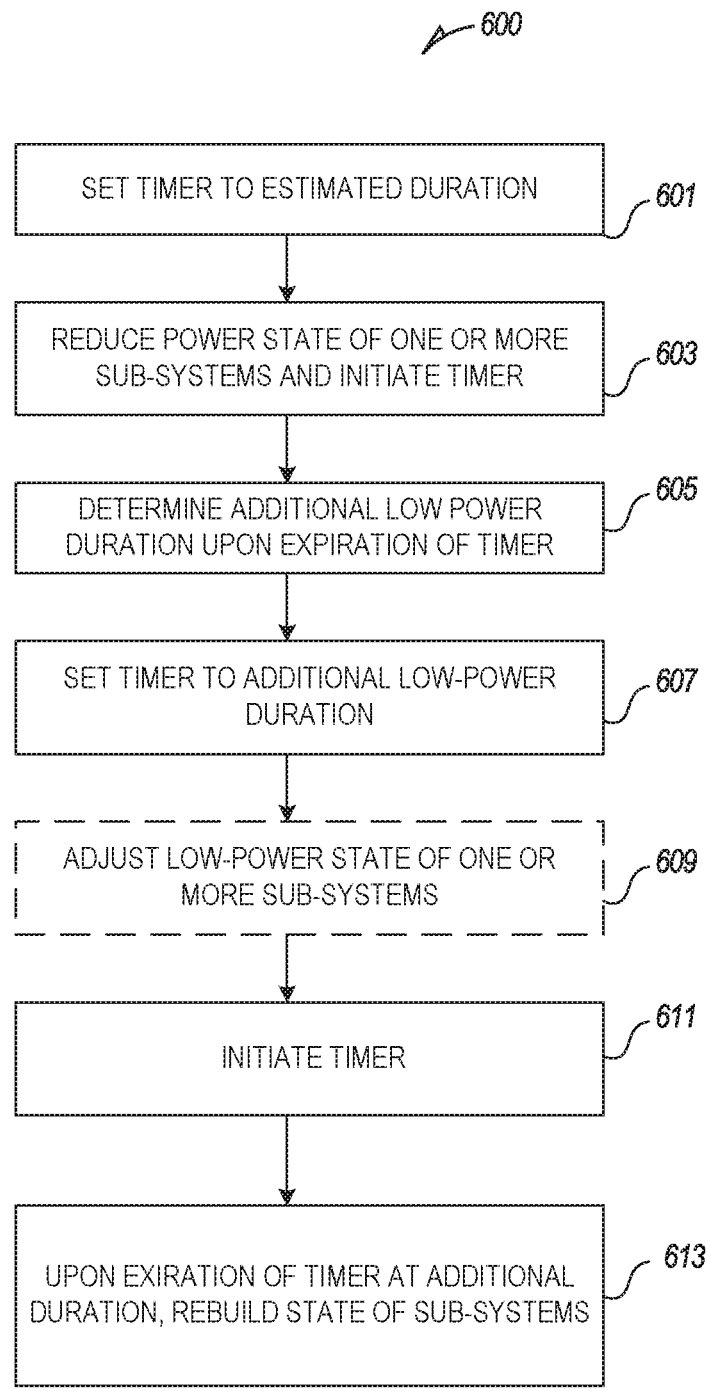
FIG. 6 illustrates generally a flowchart of an example method of detecting an under-estimated duration for a low-power interval and potential remedial actions to further improve efficiency of the device during the low-power interval.

In certain examples, since the low-power implementation is configured to conserve power and provide an acceptable user experience according to the estimated or expected duration of the low-power interval, a timer can be set to monitor whether the estimate is too short. FIG. 6 illustrates generally a flowchart of an example method 600 of detecting an under-estimated duration for a low-power interval and potential remedial actions to further improve efficiency of the device during the low-power interval. At 601, control circuitry of the device can set a timer of the device to the estimated duration of the impending low-power interval. At 603, the power state of one or more sub-systems, including non-volatile memory, for example, can be reduced and the timer initiated. In certain examples, the timer is set at the estimated duration or a longer. In certain examples, it is anticipated that the device will awaken and exit the low-power interval at or just before the estimated duration. In addition, it is assumed that should the low-power interval exist at or longer than the estimated duration, the estimate was flawed and additional power savings during the low-power interval are possible. At 605, upon expiration of the timer, a second duration estimate of the current low-power interval can be determined. In certain examples, the power state of one or more of the sub-systems can be changed to improve power savings during the additional, estimated duration of the low-power interval.

In some examples, the algorithm used to determine the first duration estimate can be used to determine the second duration estimate. In some examples, a second algorithm can be implemented to further estimate the pending duration of the pending low-power interval. In such examples, the training aspect may retain a larger historic data set and that larger data set can be sorted, and the duration associated with a certain percentile (e.g., 95% percentile or larger) can be selected as the second duration estimate to continue timing the current low-power interval. In some examples, upon expiration of the timer at the at the first duration estimate, the timer can be reset with a maximum low-power duration and the low-power state can resume. At 607, the timer can be reset to expire at the second duration estimate. At 609, the power states of one or more sub systems, such as non-volatile memory including manage NAND memory, can be adjusted. At 611, the timer can be initialized to continue monitoring the current low-power interval.

In certain examples, if the device is not awakened by an internal request or wake-up indication, at 613, upon expiration of the timer at the maximum duration, the device can optionally be awoken and a state of the subsystems, as well as the device itself, can be rebuilt to the state the device was in at the initiation of the low-power interval. In such examples, memory active during the low-power interval can be used to provide saved state information used to rebuild the states of the subsystems. In some examples, instead of rebuilding the state of the subsystems, the method can loop to the method of FIG. 5 and start building a new estimated duration.

Figure 7:
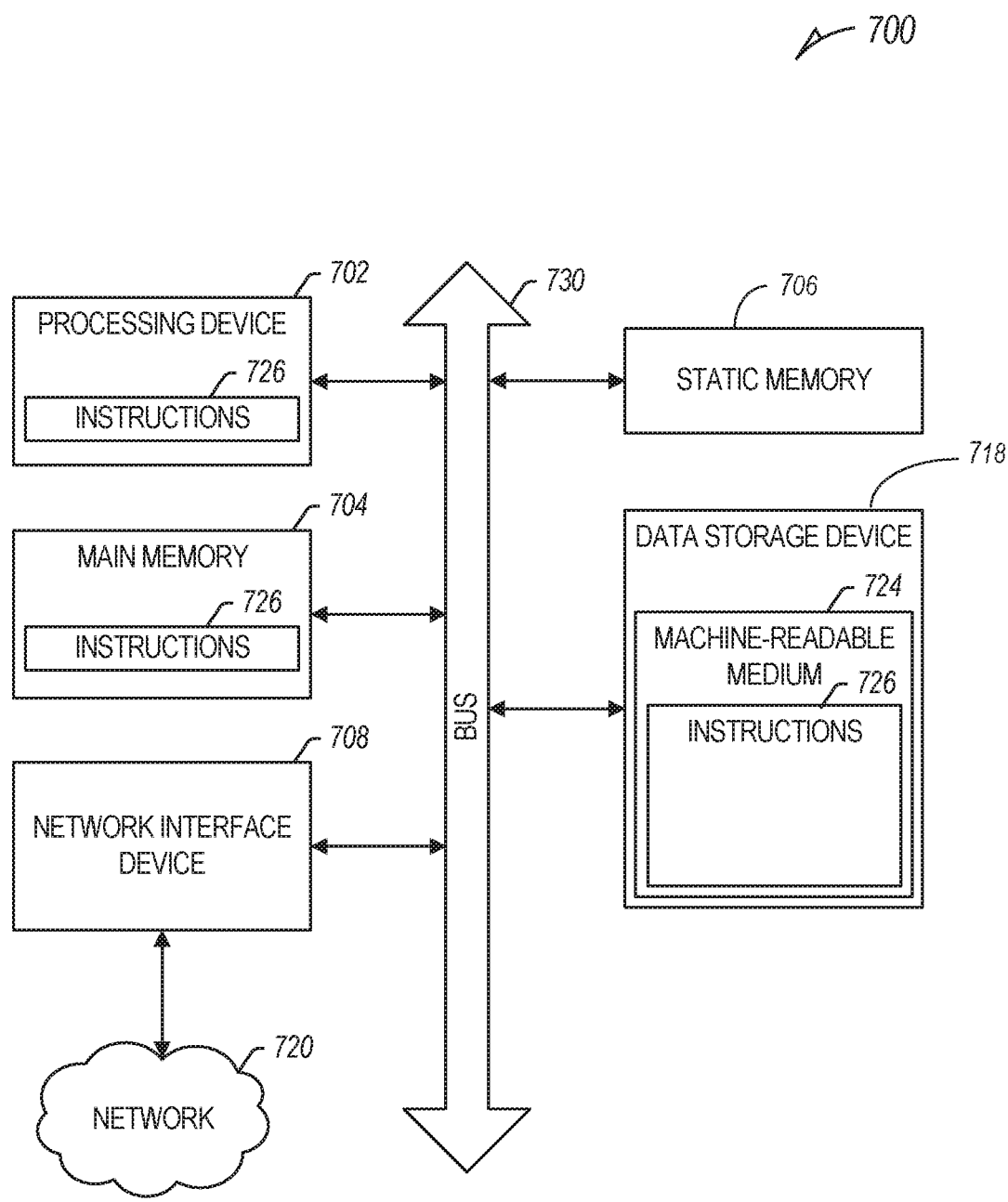
FIG. 7 illustrates a block diagram of an example machine upon which any one or more of the techniques (e.g., methodologies) discussed herein may perform.

FIG. 7 illustrates a block diagram of an example machine 700 upon which any one or more of the techniques (e.g., methodologies) discussed herein may perform. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 700 (e.g., the host 105, the memory device 110, etc.) may include a processing device 702 (e.g., a hardware processor, a central processing unit (CPU), a graphics processing unit (GPU), a hardware processor core, or any combination thereof, such as a memory controller of the memory device 110, etc.), a main memory 704 (e.g., read-only memory (ROM), flash memory, dynamic random-access memory (DRAM) such as synchronous DRAM (SDRAM) or Rambus DRAM (RDRAM), etc.), a static memory 706 (e.g., flash memory, static random-access memory (SRAM), etc.), and a data storage system 718, some or all of which may communicate with each other via an interlink (e.g., bus) 730.

The processing device 702 can represent one or more general-purpose processing devices such as a microprocessor, a central processing unit, or the like. More particularly, the processing device or processing circuitry can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 702 can also be one or more special-purpose processing devices such as an application specific integrated circuit (ASIC), a field programmable gate array (FPGA), a digital signal processor (DSP), network processor, or the like. The processing device 702 can be configured to execute instructions 726 for performing the operations and steps discussed herein. The computer system 700 can further include a network interface device 708 to communicate over a network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 or within the processing device 702 during execution thereof by the computer system 700, the main memory 704 and the processing device 702 also constituting machine-readable storage media. The machine-readable storage medium 724, the data storage system 718, or the main memory 704 can correspond to the memory device 110 of FIG. 1.

In one implementation, the instructions 726 include instructions to implement functionality corresponding to estimating a low-power duration and placing one or more of the subsystems into a low-power mode as discussed above with respect to FIG. 5, and FIG. 6. While the machine-readable storage medium 724 is shown in an example implementation to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The machine 700 may further include a display unit, an alphanumeric input device (e.g., a keyboard), and a user interface (UI) navigation device (e.g., a mouse). In an example, one or more of the display unit, the input device, or the UI navigation device may be a touch screen display. The machine a signal generation device (e.g., a speaker), or one or more sensors, such as a global positioning system (GPS) sensor, compass, accelerometer, or one or more other sensor. The machine 700 may include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The instructions 726 (e.g., software, programs, an operating system (OS), etc.) or other data are stored on the data storage device 718 can be accessed by the main memory 704 for use by the processing device 702. The main memory 704 (e.g., DRAM) is typically fast, but volatile, and thus a different type of storage than the data storage device 718 (e.g., an SSD), which is suitable for long-term storage, including while in an "off" condition. The instructions 726 or data in use by a user or the machine 700 are typically loaded in the main memory 704 for use by the processing device 702. When the main memory 704 is full, virtual space from the data storage device 718 can be allocated to supplement the main memory 704; however, because the data storage device 718 device is typically slower than the main memory 704, and write speeds are typically at least twice as slow as read speeds, use of virtual memory can greatly reduce user experience due to storage device latency (in contrast to the main memory 704, e.g., DRAM). Further, use of the data storage device 718 for virtual memory can greatly reduce the usable lifespan of the data storage device 718.

In contrast to virtual memory, virtual memory compression (e.g., the Linux™ kernel feature "ZRAM") uses part of the memory as compressed block storage to avoid paging to the data storage device 718. Paging takes place in the compressed block until it is necessary to write such data to the data storage device 718. Virtual memory compression increases the usable size of the main memory 704, while reducing wear on the data storage device 718.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host (e.g., a host device), and are often removable and separate components from the host. In contrast, eMMC™ devices are attached to a circuit board and considered a component of the host, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host using a low-voltage differential signaling (LVDS) serial interface with dedicated read/write paths, further advancing greater read/write speeds.

The instructions 724 may further be transmitted or received over a network 720 using a transmission medium via the network interface device 708 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 708 may include one or more physical jacks (e.g., Ethernet, coaxial, or phone jacks) or one or more antennas to connect to the network 720. In an example, the network interface device 708 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700, and includes digital or analog communications signals or other intangible medium to facilitate communication of such software.

ADDITIONAL NOTES AND EXAMPLES

In a first example, Example 1, a method can include storing a duration of a plurality of low-power intervals of a device; determining a probable duration of a next low-power interval of the device based on the durations of the plurality of low-power intervals: determining a low-power state of the device for the next low-power interval based on the probable duration; upon initiating the next low-power interval, saving state information of one or more sub-systems of the device to provide first state information in response to the low-power state; and upon initiating the next low-power interval, reducing a power state of the one or more sub-systems.

In Example 2, the subject matter of Example 1 includes, determining a maximum duration of the next low-power interval based on the durations of the plurality of low-power intervals.

In Example 3, the subject matter of Example 2 includes, determining a maximum duration of the next low-power interval based on the probable duration of the next low-power interval.

In Example 4, the subject matter of Examples 2-3 includes, upon initiating the next low-power interval, initiating a timer configured to expire at an end of the maximum duration.

In Example 5, the subject matter of Examples 2-4 includes, receiving a wake-up indication during the next low-power interval.

In Example 6, the subject matter of Example 5 includes, in response to the wake-up indication and when a duration of the next low-power interval is less than the maximum duration: saving the duration of the next low-power interval with the durations of the plurality of low-power intervals; increasing a power state of the one or more sub-systems; and rebuilding a state of each of the one or more sub-systems using the first state information.

In Example 7, the subject matter of Examples 5-6 includes, when duration of the next low-power interval is more than the maximum duration: determining a second probable duration of a next low-power interval of the device based on a pending duration of the next low-power interval and the durations of the plurality of low-power intervals; determining a second low-power state of the device for the next low-power interval based on the second probable duration; determining a second maximum duration of the next low-power interval based on the durations of the plurality of low-power intervals; and initiating the second low-power state of the device.

In Example 8, the subject matter of Example 7 includes, wherein the initiating the second low-power state includes saving second state information of a second one or more sub-systems of the device to provide second state information.

In Example 9, the subject matter of Example 8 includes, wherein the initiating the second low-power state includes reducing a power state of the second one or more sub-systems.

In Example 10, the subject matter of Examples 7-9 includes, wherein the initiating the second low-power state includes initiating a timer configured to expire at an end of the second maximum duration as timed from a beginning of the next low-power interval.

Example 11 is a memory device comprising: a memory array comprising multiple memory cells; and a memory controller configured to perform operations comprising: storing a duration of a plurality of low-power intervals of a device; determining a probable duration of a next low-power interval of the device based on the durations of the plurality of low-power intervals; determining a low-power state of the device for the next low-power interval based on the probable duration; and upon initiating the next low-power interval, saving state information of one or more sub-systems of the device to provide first state information, and reducing a power state of the one or more sub-systems.

In Example 12, the subject matter of Example 11 includes, wherein configuration of the memory controller is caused by execution of instructions stored on the memory device by processing circuitry of the memory controller.

In Example 13, the subject matter of Examples 11-12 includes, wherein the memory controller is further configured to perform operations comprising determining a maximum duration of the next low-power interval based on the durations of the plurality of low-power intervals.

In Example 14, the subject matter of Example 13 includes, wherein the memory controller is further configured to perform operations comprising determining a maximum duration of the next low-power interval based on the probable duration of the next low-power interval.

In Example 15, the subject matter of Examples 13-14 includes, wherein the memory controller is further configured to perform operations comprising, upon initiating the next low-power interval, initiating a timer configured to expire at an end of the maximum duration.

In Example 16, the subject matter of Examples 13-15 includes, wherein the memory controller is further configured to perform operations comprising receiving a wake-up indication during the next low-power interval.

In Example 17, the subject matter of Example 16 includes, wherein the memory controller is further configured to perform operations comprising, in response to the wake-up indication and when a duration of the next low-power interval is less than the maximum duration: saving the duration of the next low-power interval with the durations of the plurality of low-power intervals; increasing a power state of the one or more sub-systems; and rebuilding a state of each of the one or more sub-systems using the first state information.

In Example 18, the subject matter of Examples 16-17 includes, wherein the memory controller is further configured to perform operations comprising, when duration of the next low-power interval is more than the maximum duration: determining a second probable duration of a next low-power interval of the device based on a pending duration of the next low-power interval and the durations of the plurality of low-power intervals; determining a second low-power state of the device for the next low-power interval based on the second probable duration; determining a second maximum duration of the next low-power interval based on the durations of the plurality of low-power intervals; and initiating the second low-power state of the device.

In Example 19, the subject matter of Example 18 includes, wherein the memory controller is further configured to perform operations comprising saving second state information of a second one or more sub-systems of the device to provide second state information.

In Example 20, the subject matter of Example 19 includes, wherein the memory controller is further configured to perform operations comprising reducing a power state of the second one or more sub-systems.

In Example 21, the subject matter of Examples 18-20 includes, wherein the memory controller is further configured to perform operations comprising initiating a timer configured to expire at an end of the second maximum duration as timed from the beginning of the next low-power interval.

Example 22 is at least one machine-readable medium including instructions that, when executed by processing circuitry, cause the processing circuitry to perform operations to implement of any of Examples 1-21.

Example 23 is an apparatus comprising means to implement of any of Examples 1-21.

Example 24 is a system to implement of any of Examples 1-21.

Example 25 is a method to implement of any of Examples 1-21.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" may include "A but not B," "B but not A," and "A and B." unless otherwise indicated. In the appended claims, the terms "including" and "in which" are used as the plain-English equivalents of the respective terms "comprising" and "wherein". Also, in the following claims, the terms "including" and "comprising" are open-ended. A system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

Operating a memory cell, as used herein, includes reading from, writing to, or erasing the memory cell. The operation of placing a memory cell in an intended state is referred to herein as "programming," and can include both writing to or erasing from the memory cell (e.g., the memory cell may be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device may be configured to provide wear cycle information to the memory device with each memory operation. The memory device control circuitry (e.g., control logic) may be programmed to compensate for memory device performance changes corresponding to the wear cycle information. The memory device may receive the wear cycle information and determine one or more operating parameters (e.g., a value, characteristic) in response to the wear cycle information.

Method examples described herein can be machine, device, or computer-implemented at least in part. Some examples can include a computer-readable medium, a device-readable medium, or a machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMs), read only memories (ROMs), solid state drives (SSDs). Universal Flash Storage (UFS) device, embedded MMC (eMMC) device, and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method comprising:
   storing a duration of multiple low-power intervals of a memory device, including storing an additional respective metric for individual intervals of the low-power intervals;
   determining a first probable duration of a next low-power interval of the device based on the durations of the low-power intervals and based on at least one of the stored additional metrics;
   determining a first low-power state of a portion of the device for the next low-power interval based on the first probable duration, wherein the determined low power state is one of multiple low-power states;
   upon initiating the next low-power interval, saving state information of one or more sub-systems of the memory device to provide first state information in response to the determined first low-power state;
   after saving the first state information, placing one or more arrays of the memory device into the determined low-power state; and
   when a duration of the next low-power interval exceeds a maximum duration:
      determining a second probable duration of a subsequent low-power interval of the device based on a pending duration of the next low-power interval and the durations of the low-power intervals; and
      determining a second low-power state of the device for the subsequent low-power interval based on the second probable duration.

2. The method of claim 1, including determining the maximum duration of the next low-power interval based on the durations of the low-power intervals.

3. The method of claim 1, including determining the maximum duration of the next low-power interval based on the first probable duration of the next low-power interval.

4. The method of claim 2, including, upon initiating the next low-power interval, initiating a timer configured to expire at an end of the maximum duration.

5. The method of claim 2, comprising receiving a wake-up indication during the next low-power interval.

6. The method of claim 5, wherein in response to the wake-up indication and when a duration of the next low-power interval is less than the maximum duration:
   saving the duration of the next low-power interval with the durations of the low-power intervals;
   increasing a power state of the one or more sub-systems; and
   rebuilding a state of each of the one or more sub-systems using the first state information.

7. The method of claim 1, including, when the duration of the next low-power interval exceeds the maximum duration:
   determining a second maximum duration of the subsequent low-power interval based on the durations of the low-power intervals; and
   initiating the second low-power state of the device.

8. The method of claim 7, wherein the initiating the second low-power state includes saving second state information of a second one or more sub-systems of the device to provide second state information.

9. The method of claim 8, wherein the initiating the second low-power state includes reducing a power state of the second one or more sub-systems.

10. The method of claim 7, wherein the initiating the second low-power state includes initiating a timer configured to expire at an end of the second maximum duration as timed from a beginning of the next low-power interval.

11. The method of claim 1, wherein saving state information of the one or more sub-systems of the memory device comprises saving state information corresponding to the one or more arrays of the memory device.

12. The method of claim 1, wherein storing the additional respective metric for individual intervals of the low-power intervals includes storing day information or time of day information for the individual intervals.

13. A memory device comprising:
   a memory array comprising multiple memory cells; and
   a memory controller configured to perform operations comprising:

storing duration information about each of multiple low-power intervals of a device that comprises the memory array;
storing an additional respective metric for individual intervals of the low-power intervals;
determining a first probable duration of a next low-power interval of the device based on the duration information about the low-power intervals and based on at least one of the stored additional metrics;
determining a first low-power state of a portion of the memory array of the device for the next low-power interval based on the first probable duration, wherein the determined low power state is one of multiple low-power states;
upon initiating the next low-power interval, saving state information about the portion of the memory array of the device to provide first state information, and reducing a power state of at least a portion of the device in response to the determined first low-power state;
after saving the first state information, placing one or more arrays of the memory device into the determined low-power state; and
when a duration of the next low-power interval exceeds a maximum duration:
determining a second probable duration of a subsequent low-power interval of the device based on a pending duration of the next low-power interval and the durations of the low-power intervals; and
determining a second low-power state of the device for the subsequent low-power interval based on the second probable duration.

14. The memory device of claim 13, wherein configuration of the memory controller is caused by execution of instructions stored on the memory device by processing circuitry of the memory controller.

15. The memory device of claim 13, wherein the memory controller is further configured to perform operations comprising determining the maximum duration of the next low-power interval based on the duration information about the low-power intervals.

16. The memory device of claim 15, wherein the memory controller is further configured to perform operations comprising determining the maximum duration of the next low-power interval based on the probable duration of the next low-power interval.

17. The memory device of claim 15, wherein the memory controller is further configured to perform operations comprising, upon initiating the next low-power interval, initiating a timer configured to expire at an end of the maximum duration.

18. The memory device of claim 15, wherein the memory controller is further configured to perform operations comprising receiving a wake-up indication during the next low-power interval.

19. The memory device of claim 18, wherein the memory controller is further configured to perform operations comprising, in response to the wake-up indication and when a duration of the next low-power interval is less than the maximum duration:
saving the duration of the next low-power interval with the duration information about the low-power intervals;
increasing a power state of one or more portions of the device; and
rebuilding a state of each of one or more portions of the device using the first state information.

20. The memory device of claim 18, wherein the memory controller is further configured to perform operations comprising:
determining a second maximum duration of the subsequent low-power interval based on the duration information about the low-power intervals; and
initiating the second low-power state of the device.

21. The memory device of claim 20, wherein the memory controller is further configured to perform operations comprising saving second state information of a second one or more sub-systems of the device to provide second state information.

22. The memory device of claim 21, wherein the memory controller is further configured to perform operations comprising reducing a power state of the second one or more sub-systems.

23. The memory device of claim 20, wherein the memory controller is further configured to perform operations comprising initiating a timer configured to expire at an end of the second maximum duration as timed from a beginning of the subsequent low-power interval.

24. A method comprising:
storing duration information for each of multiple low-power intervals of a memory device, including storing an additional respective metric for individual intervals of the multiple low-power intervals;
determining a probable duration of a next low-power interval of the device based on the duration information for each of the multiple low-power intervals and based on at least one of the stored additional respective metrics for the individual intervals of the multiple low-power intervals;
determining a maximum duration of the next low-power interval of the device based on the stored durations of the multiple low-power intervals;
determining a first low-power state of a portion of the device for the next low-power interval based on the probable duration, wherein the determined first low-power state is one of multiple different low-power states;
upon initiating the next low-power interval, (1) saving state information of one or more sub-systems of the memory device to provide first state information in response to the determined first low-power state, and (2) after saving the first state information, placing one or more arrays of the memory device into the determined first low-power state; and
when a duration of the next low-power interval is greater than the maximum duration, determining a second probable duration of a subsequent low-power interval of the device based on a pending duration of the next low-power interval and based on the duration information for each of the multiple low-power intervals, and initiating the subsequent low-power interval by saving other state information of the memory device, and after saving the other state information, placing one or more other portions of the memory device into a second low-power state.

25. The method of claim 24, comprising, upon the initiating the next low-power interval, initiating a timer configured to expire at an end of the maximum duration, and identifying the duration of the next low-power interval is greater than the maximum duration based on expiration of the timer.

26. The method of claim 24, wherein the initiating the subsequent low-power interval includes initiating a timer configured to expire at an end of a second maximum duration as timed from a beginning of the next low-power interval.

\* \* \* \* \*